Patented June 24, 1930

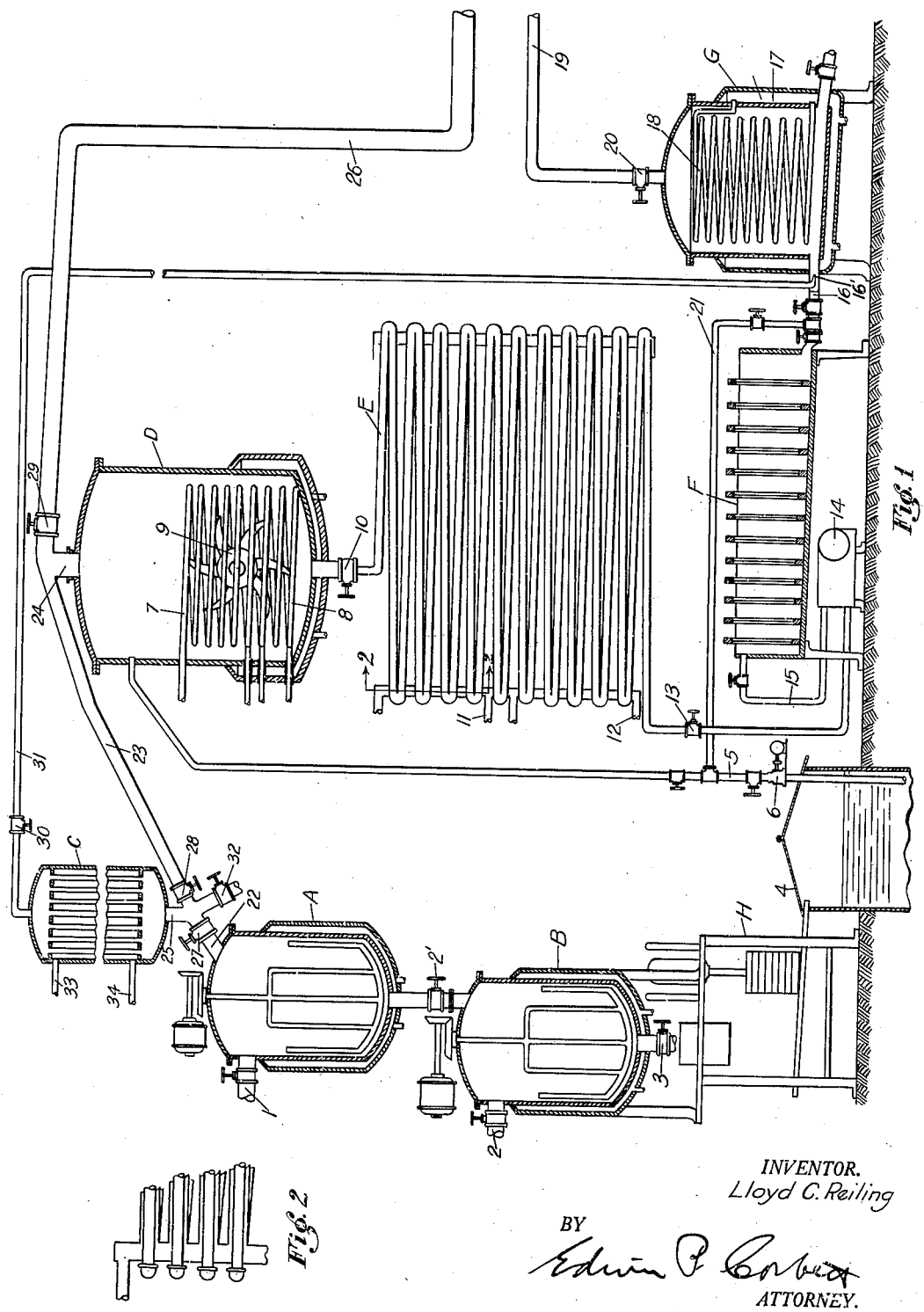

1,767,399

UNITED STATES PATENT OFFICE

LLOYD C. REILING, OF COLUMBUS, OHIO

PROCESS OF PRODUCING GRAPE JUICE

Application filed May 17, 1927. Serial No. 192,114.

My invention relates to a process of producing grape juice. It is directed primarily to the production of grape juice, either in concentrated or non-concentrated form. It is also applicable to some extent to the production of other fruit juices.

It has been found that the methods heretofore employed in the production of grape juice do not sufficiently effect the removal of the excess materials present in the grape juice, the result being that an undesirable deposition and deterioration takes place in the trade packages during storage.

Furthermore, the grape juice for sale on the market is inferior in both its flavor and aroma. It is also inferior in its color, that is, it has too greatly departed from the natural color of the freshly expressed juice.

Furthermore, the methods previously used for removing tartrates and other undesirable materials have been costly, both from the standpoint of time and money. Long storing of the juice has hitherto been considered necessary in order to ensure sedimentation. This has usually consumed a period of from two to twelve months, depending upon certain factors, especially, temperature conditions. Elimination of the excessive tartrates by freezing has been suggested but, even when this method is used, the freezing temperature is kept up over a period of twenty-four hours, at least.

My process provides for the preservation of both the aroma-producing substances and the coloring of the natural grapes being treated. The aroma may be separated from the grape, either before being pressed, or from the expressed juice, or from both, and preserved for subsequent reabsorption either into concentrated or non-concentrated grape juice, or even into some other juice or material. Then the color of the natural grapes being treated is preserved and carried by the juice expressed or otherwise separated from the grapes.

In carrying out my invention, I am able to extract most of the aroma-producing substance and coloring matter simultaneously by the use of one heat treatment. This heat treatment is preferably performed in vacuo and this is desirable owing to the fact that a maximum proportion of aroma-producing substances may be removed in a minimum period of time while, at the same time, the temperature may be maintained sufficiently low to avoid impairment of the natural color of the juice and to avoid other undesirable effects.

Furthermore, in carrying out my invention, the excess tartrates and other undesirable materials are removed in a few minutes by raising the temperature of the juice to a comparatively high degree and then suddenly dropping the temperature to a comparatively low degree and subsequently filtering. In the raising of the temperature, preliminary to sudden dropping for this purpose, the additional aroma-producing substances given off may be preserved and subsequently used.

I shall set forth hereafter a method of treating one particular class of grapes under certain given conditions of temperature and vacuum, but it will be understood that these conditions of vacuum and temperature may vary with the variety and within the variety of grapes being treated.

In carrying on my invention, for example, in connection with the preparation of juice from Concord grapes, the grapes, after being prepared by washing, stemming and crushing when considered desirable, are subjected for a limited period of time to a temperature ranging from 110 to 160° F., the limit of the time of heating being determined to a considerable extent by the temperature employed. It will be understood that many varieties of grapes need not be stemmed. Thus, at a temperature of 138° F., the grapes may be heated approximately twenty minutes without affecting the color to an appreciable extent. With higher temperatures, a shorter period of time should be employed and with lower temperatures a slightly longer period of heating may be used.

In the following description of a process embodying my invention, I have set forth details of operation in connection with the treatment of a particular variety of grapes;

namely, Concord grapes. It is to be understood that the specific temperatures and periods of time referred to are subject to some degree of variation, as the proper temperature and time conditions vary somewhat with different varieties of grapes and, to a certain extent, within the variety, depending upon local conditions of growth.

One form of apparatus which I may utilize in performing my method is shown in the accompanying drawing wherein similar characters of reference designate corresponding parts and wherein Figure 1 is a diagrammatic representation of a series of units which may be utilized in performing my process.

Figure 2 is a detail view showing a portion of the cooling apparatus which I use preliminary to the removal of tartrates and other undesirable materials.

In the drawings, a kettle A is shown as being provided with an inlet under the control of a valve 1 and with a mechanically operated stirrer. This kettle A is provided with a water jacket so that the grapes which are placed therein may be heated to temperatures to be described.

The kettle A is connected at its base with a kettle B of similar construction. This kettle B is provided with a valve-controlled inlet 2 and the conduit connecting the base of the kettle A with the kettle B is also under the control of a valve 2′.

The kettle B has an outlet in its base leading to a press H and this outlet is under the control of a valve 3. A pipe is provided leading from the press H into a juice container 4.

A pipe 5 leads from the juice container 4 and pump 6 into a vacuum pan D. This vacuum pan D is provided with an upper coil 7 and a lower coil 8. It is also provided with an agitator 9.

There is an outlet in the base of the vacuum pan D which is also under the control of a valve 10 and which leads into a cooling unit E provided with an upper coil 11 for cooling water and a lower coil 12 for brine.

Leading from the cooling unit E, is a pipe under the control of a valve 13. This pipe leads to a pump 14 which is, in turn, connected to a valve-controlled pipe 15 leading to the filter press F.

The filter press F is connected at its outlet end with a reabsorption unit G by means of a conduit 16. This reabsorption unit G is, preferably, equipped with a jacket 17 for cooling and may also be provided with an internal cooling coil 18. It has an outlet at its base which may lead to a bottler and which is, preferably, valve-controlled. The interior of the unit is connected to vacuum by a pipe 19 under the control of the valve 20.

A recirculation pipe 21 is connected to the conduit 16, valves being provided upon either side of this connection. This recirculation pipe is also provided with a valve therein and is connected at its opposite end to the pipe 5. The principal purpose of this recirculation pipe is to return the juice after it leaves the filter press to the vacuum pan D for duplicate treatment.

The upper end of the kettle A is provided with an outlet pipe 22 that connects with a pipe 23 which is, in turn, connected to the vacuum pan D by pipe 24. The pipe 22 and the pipe 23 are connected at their points of juncture to a pipe 25 leading to a tubular condenser C. The pipe 23, at its juncture with the vacuum pan pipe 24, is provided with a branch pipe 26 leading direct to a vacuum pump. Valves 27, 28, 29 and 30 mainly control the passage of the aromatic gases from the kettle A and from the vacuum pan D to the condenser C for the removal of moisture therefrom. The aromatic gases are drawn through the condenser C by means of a pipe 31 which leads into the conduit 16 between the filter press and the reabsorption unit and is, therefore, subject to the vacuum produced in this reabsorption unit through the medium of the vacuum pipe 19.

It will be understood that the valve 28 may be closed to preclude the aromatic gases from the vacuum pan from entering the condenser C. If, under this condition, grapes are being heated in the kettle A and the valve 27 is open while the valve 30 is open and the vacuum effective upon the interior of the reabsorption unit, the aromatic gases will pass from the kettle A through the condenser C and a dry cool gas will pass onward through the pipe 31. If the valves 29 and 10 are closed, the aromatic gases from the vacuum pan D will also be drawn through the condenser C. A drain pipe for the condenser is also provided and is under the control of a valve 32.

In carrying out the invention, the grapes, which have previously been washed, in some cases stemmed and crushed, are introduced through the inlet pipe 1 into the jacketed kettle or chamber designated A on the drawings, this chamber being suitably provided with a heating jacket or other heating means. It is to be understood, with reference to this kettle, that all parts thereof in contact with the fruit or fruit juices or the vapors therefrom are, desirably, of substantially non-corrodible material, preferably, glass enameled, and that the same is true for all other parts of the apparatus, as here set forth.

In the kettle A, the prepared grapes are heated for a limited period of time to a temperature of from 110° to 160° F., being, preferably, agitated, during the heating period. The time of heating with a particular batch of grapes should be varied accordingly as a higher or lower temperature is employed. Thus, with a temperature of 138° F., the grapes may be heated approximately twenty minutes in the case of Ohio Concord grapes. With higher temperatures, a shorter period of time should be employed, and, with lower temperatures, a somewhat longer period may be used. By the control of the temperature and time of heating, as above set forth, in conjunction with other steps of my method, the full color of the grape may be secured in the grape juice product without impairment and without development of the unnatural red color frequently found in commercial juice products.

During the heating of the grapes in the manner above set forth, the vapor products given off are, preferably, withdrawn through the vapor line 22 provided with a valve 27 and caused to pass through the pipe 25 into the tubular condenser C. These vapors pass through the tubes of the condenser, the exterior of these tubes being cooled by water or other suitable cooling means, introduced through the pipe 33 and passing out through the pipe 34. The condensate formed in the tubular condenser, consisting largely of water, is, preferably, returned through the lines 25 and 22 to the kettle or chamber A for duplicate treatment while the uncondensed vapors, which carry the aroma-producing substances given off during the heating, pass out through the vapor line 31 to be employed as hereinafter more fully set forth. Vacuum may be applied, this being particularly desirable when it is intended to draw off the aroma-producing substances and reintroduce them into the finished product, as set forth hereinafter. Thus, in the treatment of the grapes, as above set forth, at a temperature of about 138° F., a vacuum of 24 inches of mercury has been successfully employed.

From the jacketed kettle A, the treated fruit passes through the valve 2' into a second jacketed kettle B, which may be of a construction similar to the kettle A. This kettle B is, preferably, cooled to reduce the temperature of the grapes in those cases where these grapes have been previously heated in kettle A to extract the color. On the other hand, if desired, the kettle B may be heated in those cases where it is desired to pass these grapes on for pressing while hot. It will also be understood that the step of heating to extract the color may be eliminated and the grapes may be introduced directly into the press or through one or both of the kettles A and B which are, in this case, used merely as holding tanks, this latter method being desirable with certain varieties of grapes.

From the container 4, the extracted juice is pumped, or otherwise suitably forced, through the conduit 5 into a jacketed pan or kettle D, provided internally with two sets of coils 7 and 8 for heating and, likewise, provided, if desired, with an agitator 9 of suitable form. In the pan or kettle D, the juice is rapidly heated to a temperature at which, at least, an incipient coagulation or flocculation of colloid material in the juice takes place. This temperature is, preferably, from 160° to 190° F., and in the case of the Concord grape juice prepared as above set forth, I prefer to use a temperature of about 180° F.

When the retention of the natural color is sought, the maximum temperature desired in carrying out the process is dependent upon the temperature which the extracted juice can withstand without substantial impairment of color and the minimum temperature by that requisite for coagulation of the colloid materials. There are some variations in these temperatures with different varieties of grapes and in accordance with local conditions in connection with a particular variety. The flocculation of the colloid material is, in general, accelerated by the action of the agitator 9 while the juice in the tank D is hot. With certain varieties of grapes, as soon as the occurrence of flocculation or coagulation in the chamber or pan D is noted, the juice is withdrawn and rapidly cooled. Although this cooling may be effected by passing a suitable cooling medium, such as water or brine, through the coils 7 and 8, it is preferred to withdraw the juice and pass it through a suitable cooling device. For example, I may use a double coil cooler E, in the initial portion of which the juice is cooled by water, supplied through the pipe 11 and in the latter portion of which it is cooled by brine, supplied through the line 10. The flow of juice from the pan D is controlled by the valve 10.

The cooling of the juice is carried to a temperature below 50° F., the temperature employed being, in general, determined by the relative proportion of tartrates, argols or other undesirable materials, which are regarded as desirable in the finished juice product. Thus, in the specific case of the Concord grape juice hereinbefore referred to, the rapid cooling of the juice from 180° F. to about 40° F. on leaving the pan D results in a product which, after filtering, contains about 0.6 per cent. tartrates expressed as tartaric acid. The rapid cooling in the presence of the flocculated colloid matter appears to cause the extremely rapid precipitation or deposition of the excess tartrates or other undesirable materials, permitting their immediate removal by filtering or other suitable means. If a lesser proportion of tartrates or other undesirable materials is desired in the final product, the heated flocculated juice is cooled to a lower temperature. Thus, by cooling to about 32° F., in the example set forth, followed by filtration, substantially no tartrates or other undesirable materials are found in the finished product.

By this method of heating followed by a rapid cooling, I am able to effect the substantial elimination of tartrates or other undesirable materials in a very few minutes. This constitutes a very great advance over other known methods, as for instance, the method of elimination by freezing for a twenty-four hour period, or the method of elimination by storing in glass or in wood for a period of several months.

In the event that it is desired to merely filter the flocculated colloid matter while in a cold unconcentrated state, it is taken after it leaves the cooling unit E and forced by the pump 14 through the pipe 15 and the filter press F, discharging through the line 16 into the receiver G. This receiver G is provided with a cooling jacket 17 and with an internal cooling coil 18.

By the use of a return pipe 21, the filtered juice may be taken from the outlet end of the filter and passed through this pipe 21 and the pipe 5 back to the reducing unit D, or to the juice receptacle 4, the latter being controlled by suitable valve manipulation. In this manner, by the proper manipulation of the valves, the grape juice may be subject to retreatment while the unit is closed, or it may be concentrated by a heat treatment. If treated while the unit is closed, it may then be passed again through the unit E and through the filter press F and thence to the unit G. The concentrated juice so produced may be delivered through the unit E while such unit is not subjected to a cooling medium and thus passed to the filter in such heated condition as is necessary to permit its passage through the filter.

In the apparatus illustrated, means are provided whereby, by the proper manipulation of the valves, the aroma-producing gases arising both from the treatment of the grapes in the kettle A and from the treatment of the juice in the unit D may be relieved of the moisture by passage through the condenser C and may then be introduced into the juice being delivered after filtering to a receiver G. For this purpose, the vapor line 31 leading from the condenser C, terminates within the pipe 16 leading from the filter press F into the container G, as at 16'. The arrangement is such that the aromatic gases may be delivered to the condenser C from either the kettle A through the pipe 22 or from the unit D through the outlet 24 and pipe 23. The valves provided and shown in the drawings make possible the delivery of the aromatic gases through the condenser C from both the kettle A and the unit D, simultaneously, or the gases may be delivered to the condenser from either of these members without delivering from the other. A drain pipe for the condenser is also shown as being governed by the valve 32.

If it is desired to prepare a concentrated product in carrying out my invention, I prefer to bring, initially, the extracted juice in the kettle D, for example, to a temperature such that flocculation of the colloid material will take place, subsequently cooling to cause the precipitation and removal of the tartrates or other undesirable materials, as hereinbefore described. After being filtered, the material is returned through pipe 21 and pipe 5 to the kettle D, or to a similar kettle, and there concentrated, preferably under vacuum, at a suitable temperature. The resulting product is filtered and, during cooling, preferably has injected thereinto the aroma-producing substances given off in the vapors produced during heating in kettle A and the first heating in unit D.

Various modifications of my preferred method may be utilized and I am not attempting to describe all of such modifications. It may be mentioned, however, that the tartrates and other undesirable materials may be substantially removed by heating, without the use of vacuum, and then suddenly cooling. Likewise, if desired, the aromatic gases may be conducted to a tank such as G and retained therein in gaseous form, this being effected by maintaining the tank closed and cooled to a proper temperature. Other modifications or sub-combinations of my method steps may be utilized.

It will be noted that my process as described in its preferred form is closed except at the unit H, thus, making possible the retention of the aromatic substances and the exclusion of foreign materials, whether the process is used in vacuo, atmosphere or under pressure.

The final concentrated or unconcentrated product is put into trade packages and pasteurized or sterilized in the ordinary manner, it being preferred that the pasteurizing temperature should not be above the temperature employed in preparing the juice for clarification or concentration.

By carrying out the invention in the manner hereinbefore set forth, I am able to preserve the aroma and flavor of the natural grape and to secure a substantially complete liberation of the coloring material in the grapes, without impairing it and without securing a cooked or tannic acid flavor in the grape juice. Furthermore, by the means hereinbefore set forth, I am able to secure in rapid and, if desired, continuous operation, a substantially complete removal of excess tartrates or argols or other undesirable materials and thereby avoid the necessity for long storage to effect deposition of the tartrates and other undesirable materials.

Although the invention has been described in connection with various specific details of a particular embodiment thereof, it is not intended that this shall be regarded as limitations upon the scope of the invention, except in so far as included in the accompanying claims.

Having thus described my invention, what I claim is:

1. The method of eliminating excessive tartrates from fruit juices which comprises heating the juice to approximately 180° F. and then suddenly chilling to approximately 40° F.

2. The method of treating grape substance which comprises heating in vacuo to a temperature sufficient to liberate aromatic gases while liberating the natural color, subjecting the substance to a comparatively high temperature and then suddenly chilling.

3. The method of clarifying grape juice which comprises heating the grape juice to a temperature sufficient to cause flocculation of colloid material, and subjecting the juice to a rapid cooling medium while it is still substantially at such high temperature.

4. The method of clarifying grape juice which comprises heating the grape juice to a temperature of from 150° to 190° F., thereby effecting flocculation of colloid material, and subjecting the juice to a rapid cooling while substantially at such high temperature to effect precipitation of tartrates.

5. The method of clarifying grape juice which comprises heating the grape juice to a temperature of from 150° to 190° F., thereby effecting flocculation of colloid material, subjecting the juice to a rapid cooling medium while substantially at such high temperature to reduce it to a temperature below 50° F., thereby throwing out tartrates in filtrable form, and filtering the juice.

In testimony whereof I hereby affix my signature.

LLOYD C. REILING.